United States Patent
Pearce

(10) Patent No.: US 11,341,470 B1
(45) Date of Patent: May 24, 2022

(54) SYSTEMS AND METHODS FOR SMART CARD ONLINE PURCHASE AUTHENTICATION

(71) Applicant: Wells Fargo Bank, N.A., San Francisco, CA (US)

(72) Inventor: Brian M. Pearce, Pleasanton, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1293 days.

(21) Appl. No.: 15/061,617

(22) Filed: Mar. 4, 2016

Related U.S. Application Data

(60) Provisional application No. 62/136,202, filed on Mar. 20, 2015.

(51) Int. Cl.
| | |
|---|---|
| *G06Q 20/10* | (2012.01) |
| *G06Q 20/12* | (2012.01) |
| *G06Q 20/40* | (2012.01) |
| *G06Q 20/34* | (2012.01) |
| *G06Q 20/38* | (2012.01) |

(52) U.S. Cl.
CPC .......... *G06Q 20/105* (2013.01); *G06Q 20/12* (2013.01); *G06Q 20/341* (2013.01); *G06Q 20/352* (2013.01); *G06Q 20/38215* (2013.01); *G06Q 20/409* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 2008/0255981 | A1* | 10/2008 | Shiu | G06Q 20/04 705/35 |
| 2011/0041170 | A1* | 2/2011 | Wankmueller | H04L 63/08 726/7 |
| 2014/0108263 | A1* | 4/2014 | Ortiz | G06Q 20/322 705/71 |
| 2016/0148201 | A1* | 5/2016 | Kadaster | G06Q 20/425 705/44 |
| 2018/0150840 | A1* | 5/2018 | Joung | G06Q 20/32 |

* cited by examiner

*Primary Examiner* — Jamie R Kucab
*Assistant Examiner* — Nicholas K Phan
(74) *Attorney, Agent, or Firm* — Foley & Lardner LLP

(57) ABSTRACT

Systems and methods of authenticating online purchases by detecting a presence of an authorized smart card at a personal computing device of a customer are disclosed. An issuer computing system maintains a customer database of personal information and financial information for a plurality of customers with issued smart cards. An authentication logic receives an authentication request sent from a local merchant circuit at the personal computing device over a network. The authentication request comprises an authentication code provided to the local merchant circuit by a contactless chip of a smart card. The authentication logic authenticates the authentication request by comparing the authentication code with stored information in the customer database and transmits an authentication approval to the personal computing device, wherein the authentication approval enables an online purchase transaction request corresponding to the authentication request.

18 Claims, 4 Drawing Sheets

SYSTEMS AND METHODS FOR SMART CARD ONLINE PURCHASE AUTHENTICATION

CROSS-REFERENCE TO RELATED APPLICATIONS

This application is related to and claims priority to U.S. Provisional Patent Application No. 62/136,202, entitled "SYSTEMS AND METHODS FOR SMART CARD ONLINE PURCHASE AUTHENTICATION," filed on Mar. 20, 2015, which is herein incorporated by reference in its entirety and for all purposes.

BACKGROUND

Financial institutions such as banks typically offer their customers a variety of payment alternatives to meet their needs. One such alternative is for the financial institution to offer the customer a payment card that provides the customer with quick and convenient access to a charge account from multiple locations where the card is accepted. Charge accounts can include, for example, lines of credit, checking accounts, temporary prepaid accounts, and so on. The card issuer typically provides the customer with a plastic card or other device having an account number associated therewith, and establishes a corresponding charge account for the customer. The card or other device may be used by the customer to purchase goods and services by charging the charge account. The card issuer authorizes payment for the goods or services and then enters a debit to the charge account.

Many personal computing devices such as cell phones, tablets, and laptops include software applications and hardware sufficient to provide an online marketplace. Online marketplaces allow users to purchase goods and services from remote merchants through their personal computing devices. Through an online marketplace, a given user can identify a good or service for purchase and enter payment card information into their personal computing device, which may then be used to complete a transaction.

Payment card information sufficient to complete a purchase in an online marketplace can often be found on the face of the payment card itself. As such, an unauthorized user with visual or temporary access to a payment card may be able to access an online marketplace on their own personal computing device and use the payment card information (e.g., by taking a digital image of the payment card or writing down the payment card information) to complete unauthorized purchases.

SUMMARY

One embodiment relates to a method of authenticating online purchases by detecting a presence of an authorized smart card at a personal computing device of a customer, the method being performed at a card issuer computing system. The method includes maintaining, at a customer database, personal information and financial information for a plurality of customers with issued smart cards. The method further includes receiving, by an authentication logic, an authentication request sent from a local merchant circuit at the personal computing device over a network and comprising an authentication code provided to the local merchant circuit by a contactless chip of a smart card. The method includes authenticating, by the authentication logic, the authentication request by comparing the authentication code with stored information relating to the customer in the customer database and transmitting an authentication approval to the personal computing device, wherein the authentication approval enables an online purchase transaction request corresponding to the authentication request.

Another embodiment relates to a card issuer computing system for authenticating online purchases by detecting a presence of an authorized smart card at a personal computing device of a customer. The system includes an issuer network logic structured to enable the card issuer computing system to exchange data over a network. The system further includes a customer database maintaining personal information and financial information for a plurality of customers with issued smart cards. The system includes an authentication logic. The authentication logic is structured to receive an authentication request sent from a local merchant circuit at the personal computing device over a network and comprising an authentication code provided to the local merchant circuit by a contactless chip of a smart card. The authentication logic is further structured to authenticate the authentication request by comparing the authentication code with stored information relating to the customer in the customer database and transmit an authentication approval to the personal computing device, wherein the authentication approval enables an online purchase transaction request corresponding to the authentication request.

Yet another arrangement relates to a non-transitory computer readable media having computer-executable instructions embodied therein that, when executed by a transaction circuit of a card issuer computing system, causes the card issuer computing system to perform operations to authenticate online purchases by detecting a presence of an authorized smart card at a personal computing device of a customer. The operations include maintaining, at a customer database, personal information and financial information for a plurality of customers with issued smart cards. The operations further include receiving, by an authentication logic, an authentication request sent from a local merchant circuit at the personal computing device over a network and comprising an authentication code provided to the local merchant circuit by a contactless chip of a smart card. The operations include authenticating, by the authentication logic, the authentication request by comparing the authentication code with stored information relating to the customer in the customer database and transmitting an authentication approval to the personal computing device, wherein the authentication approval enables an online purchase transaction request corresponding to the authentication request.

DETAILED DESCRIPTION

According to various embodiments, systems and methods for authenticating purchases in an online marketplace on a personal computing device is provided. At a high level, an online marketplace is a virtual medium for facilitating remote purchases for goods and services. A given online marketplace can include information such as good or service listings, prices, descriptions, reviews, and so on. In some arrangements, the online marketplace facilitates the transmission of an offer to purchase a good or service and a corresponding acceptance. Further, in some arrangements, the online marketplace further facilitates the actual exchange of funds in addition to product and service information. In some such embodiments, the online marketplace can receive payment information (e.g., payment card or financial account information) and cause funds to transfer from one account (e.g., an account associated with a buyer) to another account (e.g., an account associated with a seller). The virtual nature of the online marketplace allows for such transactions to occur when the buyer and seller (i.e., including individuals and facilities associated with each) are physically located in different places. Examples of such online marketplaces include, for example, e-commerce websites for individual merchants, or websites aggregating offerings for a plurality of merchants such as Amazon™ or eBay™, or software "apps" that provide a user interface for individual merchants or a plurality of merchants, and the like. Consistent among the embodiments discussed below, a "smart" payment card is physically present during an initial authentication process for a purchase in an online marketplace.

Figure 1:
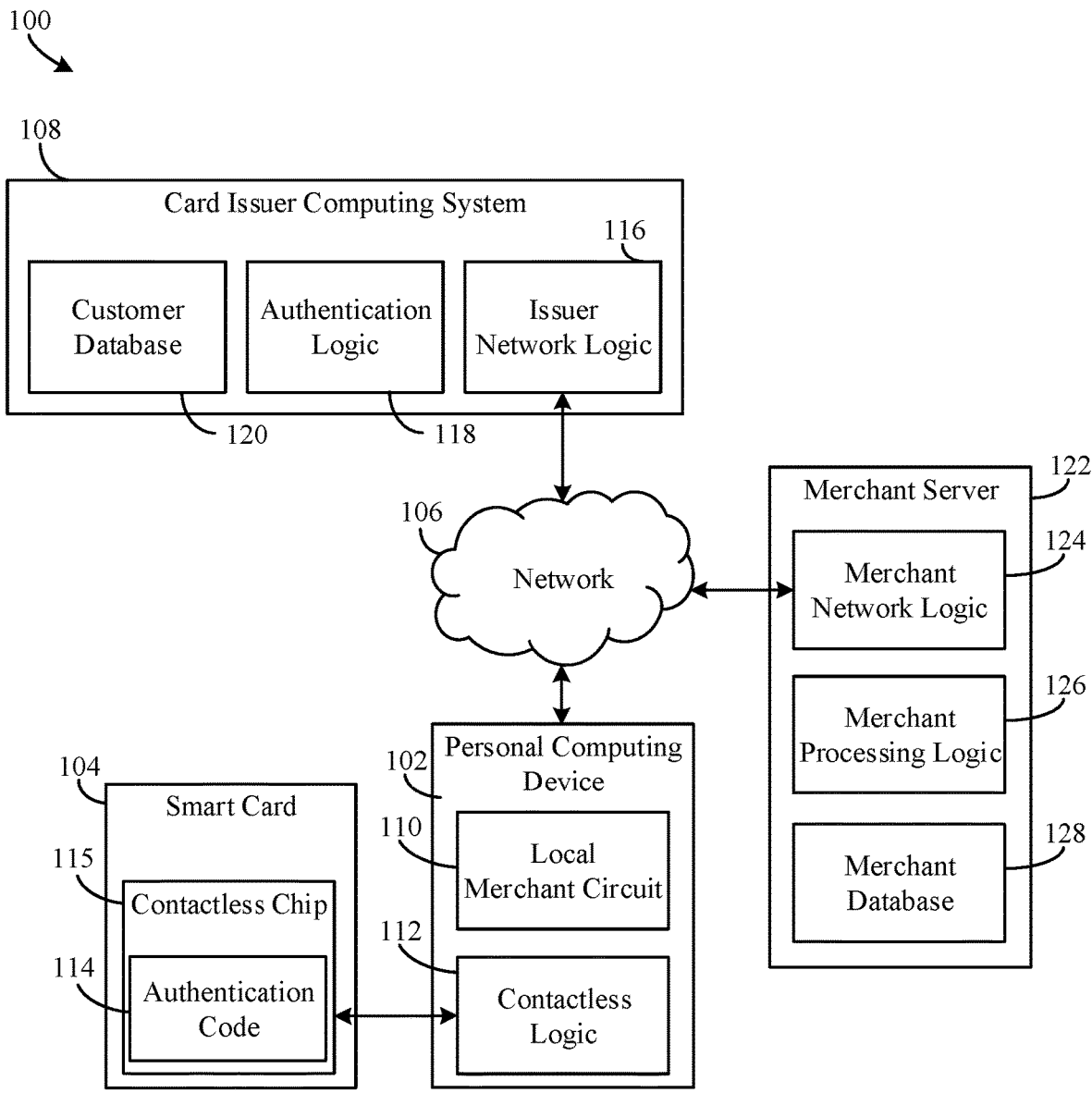
FIG. 1 is a block diagram illustrating an online purchase authentication and transaction system, according to an example embodiment.

Referring now to FIG. 1, an online purchase and authentication system 100 includes a personal computing device 102, a smart card 104, a network 106, a card issuer computing system 108, and a merchant server 122. Examples of a personal computing device 102 may include, for example, desktop computers, laptop computers, mobile phones, smartphones, tablets, wearable computing devices (e.g., eyewear), and so on. A common feature of the personal computing device 102 is the ability to access a network 106 in order to send and receive data to and from the card issuer computing system 108 and the merchant server 122, including purchase and authentication requests. The network 106 may include wireless networks (e.g., cellular networks, Bluetooth®, WiFi, Zigbee®, etc.), wired networks (e.g., Ethernet, DSL, cable, fiber-based, etc.), or a combination thereof. In some arrangements, the network 106 includes the internet.

The personal computing device 102 includes a local merchant circuit 110. The local merchant circuit 110 may include program logic executable by the personal computing device 102 to implement at least some of the functions described herein. In order to make the local merchant circuit 110, a third party provider (e.g., a software developer or publisher, which may be associated with a given merchant or online marketplace provider) can make a software application available to be placed on the personal computing device 102. In some arrangements, a software developer may make the software application available to be downloaded (e.g., via the developer's website, via an app store, or in another manner). Responsive to a user selection of an appropriate link, the software application can be transmitted to the personal computing device 102 and cause itself to be executed on the personal computing device 102. Execution of the software application creates the local merchant circuit 110 on the personal computing device. Specifically, after execution, the thus-modified personal computing device 102 includes the local merchant circuit 110 (embodied as a processor and instructions stored in non-transitory memory that are executed by the processor). In other arrangements, the software application may be remotely hosted (e.g., on the merchant server 122) as a website and accessed via an internet browser.

The personal computing device 102 further includes a contactless logic 112. The contactless logic 112 includes hardware and associated software sufficient to enable the personal computing device 102 to wirelessly and securely exchange data over short distances (e.g., within a range of a few inches or less). In some arrangements, the contactless logic 112 is configured to use radio frequency identification (RFID) to exchange digital information and data. In some such arrangements, the contactless logic 112 enables the personal computing device 102 to exchange data over a radio frequency range required for near field communication (NFC). In some arrangements, the local merchant circuit 110 includes instructions to selectively employ the contactless logic 112 to send or receive information.

The smart card 104 is a payment card associated with a charge account (e.g., a line of credit, a checking account, a prepaid account, and the like) for a given customer, and is capable of wirelessly exchanging information. The smart card 104 can include visible information on the face of the card and digital information stored within various structures in the smart card 104 itself. For example, the smart card 104 can include a customer's name and a payment card account number, which can be printed or embossed on the physical card. Further, the smart card 104 can include more detailed identifying customer information (e.g., name, address, phone number, and so on) and account information (e.g., account numbers, information as to the card issuer, and so on) in a magstrip, or an onboard contactless chip 115. For example, the smart card 104 can be a credit card, a debit card, or the like.

The contactless chip 115 is a defining feature of the "smart" aspect of the smart card 104. The contactless chip 115 is a small circuitry system configured to wirelessly exchange data. In some arrangements, the contactless chip 115 can exchange data via RFID or NFC communication. The contactless chip 115 can be configured to be able to selectively transmit various types of information, including payment card information (e.g., account numbers, issuing entities, and so on), identifying customer information (e.g., user name, billing address, phone number, and so on), cryptograms, an authentication code, and the like to other devices (e.g., to the mobile device 102, etc.). Such arrangements can be found in existing smart card functions provided by, for example, Visa payWave™, Mastercard PayPass™, and American Express ExpressPay™.

The contactless chip 115 can also be configured to transmit an authentication code 114. The authentication code 114 can include payment card information and identifying customer information, along with a cryptogram, which in some arrangements, is a sequence of characters that have been encoded through one or more algorithms to conceal data from unauthorized parties.

The card issuer computing system 108 is a computing system at a financial entity that issued the smart card 104 to a customer. In the context of the present disclosure, the financial entity can include financial institutions such as commercial or private banks, credit unions, investment brokerages, and so on, but can also include any commercial entity capable of maintaining charge accounts, including merchants, service providers, and the like. The card issuer computing system 108 is configured to manage charge accounts and to authenticate transactions involving debits from charge accounts associated with existing customers.

The card issuer computing system 108 includes an issuer network logic 116, an authentication logic 118, and a customer database 120. The issuer network logic 116 is configured to enable the card issuer computing system 108 to exchange information over the network 106. The customer database 120 can be configured to contain information for a plurality of customers with issued smart cards, including for example, personal customer information (e.g., names, addresses, phone numbers, and so on) and customers' financial information (e.g., associated financial institutions, account numbers, available credit, credit history, and so on). The information contained in the customer database 120 is sufficient for the card issuer computing system 108 to perform a variety of checks surrounding a given smart card transaction, including for example, confirming identifying customer information, determining a customer's transaction history, determining a customer's available credit, and so on.

The authentication logic 118 is configured to perform operations relating to transactions involving the smart card 104. For example, the authentication logic 118 can be configured to receive an authentication request from the local merchant circuit 110 over the network 106 via the issuer network logic 116. In some such arrangements, the authentication request includes the authentication code 114 with a cryptogram. The authentication logic 118 may then decrypt a cryptogram included in the authentication code 114, verify the resulting data and the rest of the information in the authentication code 114 using information in the customer database 120, approve or deny the authentication request, and push the approval or denial back to the local merchant circuit 110.

The merchant server 122 is a computing system associated with at least one merchant of goods or services. In some arrangements, the merchant server 122 is configured to manage the seller side of an online marketplace, which may include functions such as maintaining an up to date inventory of goods, maintaining current price information, processing purchases, and so on. Further, in some arrangements, the merchant server is configured to provide and maintain the software application giving rise to the local merchant circuit 110 in the personal computing device 102. The software application may be a stand-alone software application executed by the personal computing device 102 or an application accessed via a web browser executed by the personal computing device 102.

The merchant server 122 includes a merchant network logic 124, a merchant processing logic 126, and a merchant database 128. The merchant network logic 124 is configured to enable the merchant server 122 to exchange information over the network 106. The merchant database 128 is configured to store and maintain information relating to a merchant's wares in an online marketplace. The merchant database 128 can include information such as available product inventory, price information, good or service details, customer information, customer payment information, and so on. The merchant processing logic 126 is configured to send and receive merchant information over the network 106 via the merchant network logic 124, and to store and retrieve merchant information at the merchant database 128. In some arrangements, the merchant processing logic 126 is also configured to maintain an online marketplace by, for example, updating the content and functionality available in the local merchant circuit 110. The merchant processing logic 126 may also be configured to receive and process user purchase requests.

In operation, a customer seeking to purchase a good or service through an online marketplace via the personal computing device 102 can execute an online marketplace software application associated with the merchant server 122, giving rise to the local merchant circuit 110. The local merchant circuit 110 may be configured to cause the personal computing device 102 to present a graphical user interface on an associated display. In some arrangements, the graphical user interface prompts the customer to browse and select from available goods or services from one or more merchants. In some such arrangements, the content of the graphical user interface is updated with information received from the merchant server 122 over the network 106. The customer can identify a particular good or service for purchase through the graphical user interface (e.g., via an input device associated with the personal computing device 102, such as a touchscreen, a keyboard, a voice command, or the like) and attempt to purchase it through the personal computing device 102.

As part of the purchase process, the local merchant circuit 110 communicates with the contactless chip 115 on the smart card 104 to receive the authentication code 114 via the contactless logic 112. As discussed above, the authentication code 114 can include a cryptogram. The authentication code 114 can also include identifying customer information (e.g., name, billing address, phone number, and so on) and payment card information (e.g., charge account number, issuing entity, and so on) to provide sufficient information to complete an online purchase. In some such arrangements, the information in the authentication code 114 does not need to be manually entered by a user, and may automatically be populated in appropriate fields of the graphical user interface upon a contactless transmission of the authentication code 114. The contactless chip 115 transmits the authentication code 114 to the local merchant circuit 110 by, for example, being brought within a threshold proximity sufficient to allow a wireless data exchange between the contactless logic 112 of the personal computing device 102 and the contactless chip 114 on the smart card 104 (e.g., via RFID, NFC, or the like). Upon receiving a wireless signal transmission from the contactless chip 115, the contactless logic 112 can route the authentication code 114 to the local merchant circuit 110.

In one arrangement, the local merchant circuit 110 receives an authentication code 114 that includes a cryptogram intended to be used for authenticating the smart card 104. In one such arrangement, the local merchant circuit 110 transmits the cryptogram to the card issuer computing system 108 in an authentication request over the network 106. In some such arrangements, the authentication request is a transaction authorization request entailing a charge of little to no funds (e.g., a transaction of $0.01, or $0.00). The authentication logic 118 at the card issuer computing system 108 can receive what appears to be a normal transaction authorization request (i.e., not meaningfully distinguishable from an actual purchase transaction at a point of sale) and proceed to process the authentication request as a transaction authorization request. As such, the authentication logic 118 may not have to be altered or tailored to address the authentication request from a personal computing device 102, but can simply apply existing transaction authorization procedures instead. The authentication logic 118 can proceed to decrypt the cryptogram from the authentication code 114, and confirm that the resulting data corresponds to the smart card 104 and the user (i.e., the user attempting to participate in an online marketplace on the personal computing device 102) by, for example, retrieving data from the customer database 120. In some such arrangements, the authentication logic 118 can recognize that a requested transaction of $0.00 indicates an attempt to authorize an online purchase on a personal computing device and apply a specific set of authentication rules. If the authentication request passes all of the authentication rules at the card issuer computing system 108, the authentication logic 118 can transmit an authentication approval back to the personal computing device 102 over the network 106 via the issuer network logic 116. In some arrangements, the authentication approval includes payment card information sufficient to complete a purchase transaction.

Further, in some arrangements, the local merchant circuit 110 can take additional authentication steps at the personal computing device 102 to supplement the authentication process occurring at the card issuer computing system 108. For example, the local merchant circuit 110 can, for example, require the customer to enter a PIN number, biometric data, or answers to identification questions into a graphical user interface in the personal computing device 102. In addition, the local merchant circuit 110 can compare identifying customer information contained in the authentication code 114 received from the contactless chip 115 to identifying customer information stored in the personal computing device 102 (e.g., where the personal computing device is registered under a given individual, accounts configured in various mobile applications in the personal computing device 102, and the like).

Upon receiving an authentication approval from the card issuer computing system 108, the local merchant circuit 110 can confirm that the user and the personal computing device 102 is authorized to use the charge account(s) associated with the smart card 104. In which case, the local merchant circuit 110 can allow the personal computing device to complete an online purchase transaction.

Figure 2:
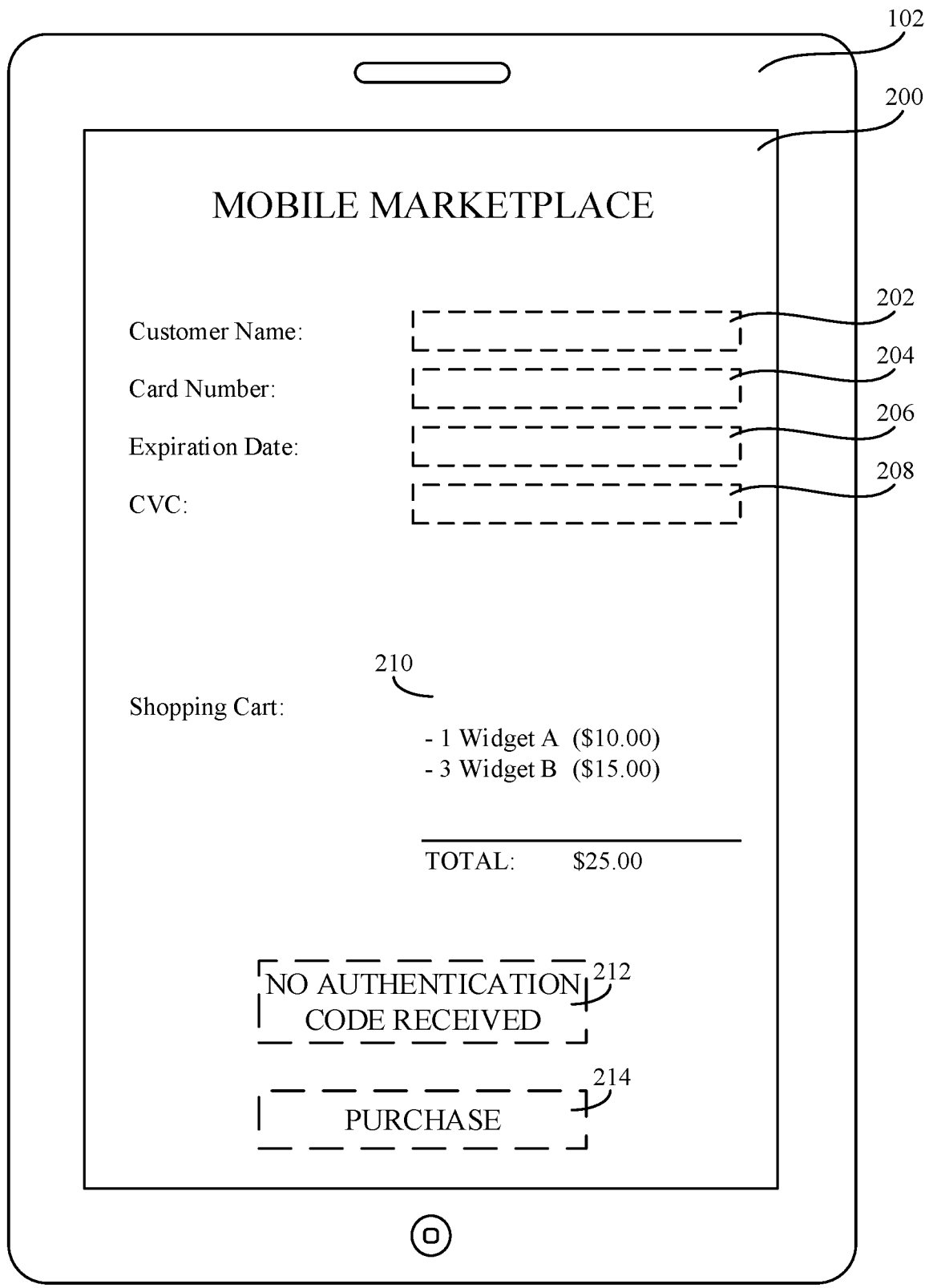
FIG. 2 is a depiction of a user interface for an online marketplace, according to an example embodiment.

Referring now to FIG. 2, an example graphical user interface 200 generated by a local merchant circuit (e.g., local merchant circuit 110) on a personal computing device 102 is shown according to one example embodiment. The graphical user interface 200 shown includes a plurality of instructions and fields directed to allow a user to purchase a good or service from an online marketplace available on the personal computing device 102. For example, the interface 200 includes instructions and fields for identifying customer information and payment card information such as a customer name 202, a payment card number 204, an expiration date 206, and a CVC 208. In this particular arrangement, the interface also includes a virtual shopping cart 210, which summarizes a customer's selected goods or services, including names (e.g., "Widget A" and "Widget B"), quantities, price, and cost total. A notification 212 toward the bottom of the interface 200 indicates that no contactless transmission (e.g., the authentication code 114) has been received. As such, implicitly, a purchase trigger 214 will not be enabled until the local merchant circuit receives an authentication code. Further, in one arrangement, the local merchant circuit can use the authentication code to populate each of the blank fields 202, 204, 206, 208 without requiring the user to manually enter corresponding information into the interface 200.

Figure 3:
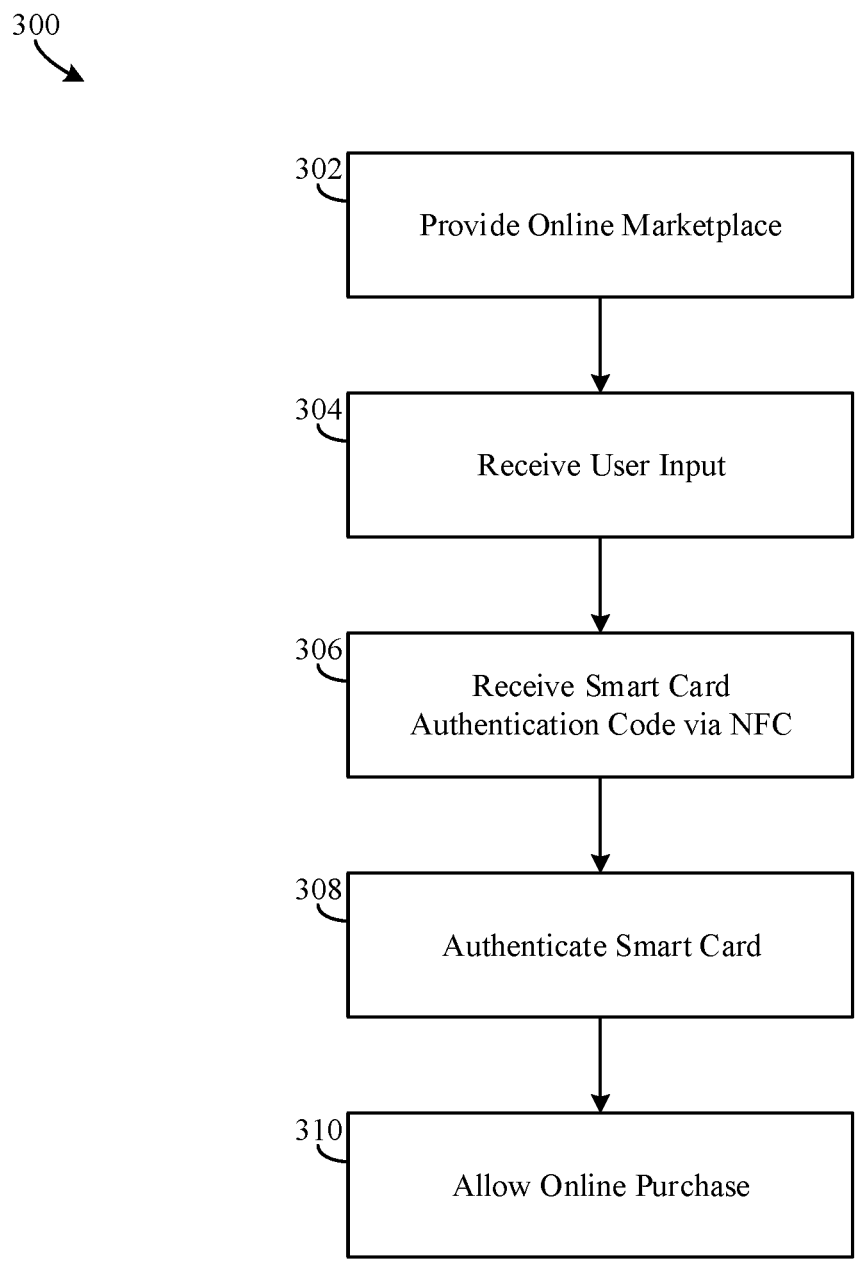
FIG. 3 is a flowchart of a method of authenticating an online purchase, according to an example embodiment.

Referring now to FIG. 3, a method 300 of completing an online purchase transaction with a personal computing device is shown. The method 300 is performed by processing and storage hardware on a personal computing device (e.g., personal computing device 102), as executed by one or more logics comprising one or more software applications configured to perform the functions described below.

At 302, an online marketplace is provided to a user. An online marketplace is a virtual medium for facilitating remote purchases for goods and services, and in some arrangements, may be visually embodied to a user as a graphical user interface on a personal computing device. A given online marketplace can include information such as good or service listings, prices, descriptions, reviews, and so on. In one arrangement, an online marketplace is offered to a user on a personal computing device after a software application obtained from an app store or a developer portal assembles a local merchant circuit (e.g., local merchant circuit 110) in the personal computing device. In other arrangements, the local merchant circuit is preconfigured in the personal computing device prior to a user purchasing the personal computing device, precluding the need for the user to download and install a software application to create the local merchant circuit. The local merchant circuit can be configured to cause the personal computing device to provide an online marketplace by providing one or more notifications or user interfaces to a user, while informing the user that access to an online marketplace is available on the personal computing device. The notifications can take the form of, for example, a pop-up notification, a link, or an icon that can be activated, leading to an online marketplace interface within the personal computing device.

At 304, user input is received. The user input includes one or more physical user inputs (e.g., keystrokes, touchscreen presses, voice commands, and so on) received at the personal computing device indicating that the user desires to participate in the online marketplace by completing an online transaction on the personal computing device. The user input can be responsive to available triggers presented in a graphical user interface (e.g., pressing a toggle, button, or link appearing on a display on the personal computing device, or the like). In some arrangements, the user input is pursuant to an initial registration and set up process for buyers seeking to complete transactions on an online marketplace (e.g., selecting a "sign up" or "register" trigger in a graphical user interface). In other arrangements, the user input includes a selection of goods or services to be purchased and an indication of an affirmative intent to complete a corresponding purchase transaction (e.g., selecting items to purchase and then selecting a "checkout" trigger in a graphical user interface).

At 306, an authentication code (e.g., authentication code 114) is received as a contactless transmission from a smart card. The authentication code is received by a local merchant circuit via a contactless logic (e.g., contactless logic 112) at the personal computing device. The authentication code can include at least one cryptogram along with other types of information (e.g., identifying customer information, payment card information, and so on) as discussed with respect to FIG. 1, above. The authentication code is received after a smart card is brought within a threshold proximity to the personal computing device such that a contactless transmission is possible (e.g., within a few inches or even touching the smart card to the personal computing device). In some arrangements, the local merchant circuit uses identifying customer information and/or payment card information included in the authentication code to populate the required fields of user information (e.g., name, billing address, shipping address, phone number, payment card account number, and so on) to register as a new user or complete a sale at an online marketplace.

At 308, a smart card is authenticated. Information, such as a cryptogram, received from the smart card is used to determine whether the personal computing device associated with the user and/or the user him or herself is authorized to perform transactions with the smart card. In one arrangement, the smart card is authenticated by decrypting an authentication code to reveal a customer name, a payment card account number, and a cryptogram, and comparing the resulting information with other sources. The decrypted information can then be used, for example, to compare corresponding information manually entered into the personal computing device by the user (e.g., the customer name), or by transmitting an authentication request (i.e., including the cryptogram) to a corresponding card issuer computing system (e.g., card issuer computing system 108). Decrypted authentication code information (e.g., a customer name and billing address) can also be compared with account information stored in the personal computing device itself (e.g., email accounts, cellular network accounts, and so on).

At 310, an online purchase is allowed. Upon successfully authenticating the smart card, the local merchant circuit can allow the personal computing device to complete online purchase transactions. As such, for example, the local merchant circuit will allow a user with a shopping cart containing purchasable items (e.g., the shopping cart 210 discussed with respect to FIG. 2) to purchase those items through the personal computing device. Further, in some arrangements, the local merchant circuit can be configured to perform the authentication process (i.e., steps 306, 308) according to authentication rules. Authentication rules can include, for example, requiring an authentication process at set intervals (e.g., every fifth subsequent purchase, or every other week, and the like) or at random (e.g., according to a random event algorithm) for subsequent purchases in the online marketplace. In some arrangements, however, once a user and a smart card is authenticated, the authentication process will not have to be repeated for subsequent purchases in an online marketplace with the same smart card.

Figure 4:
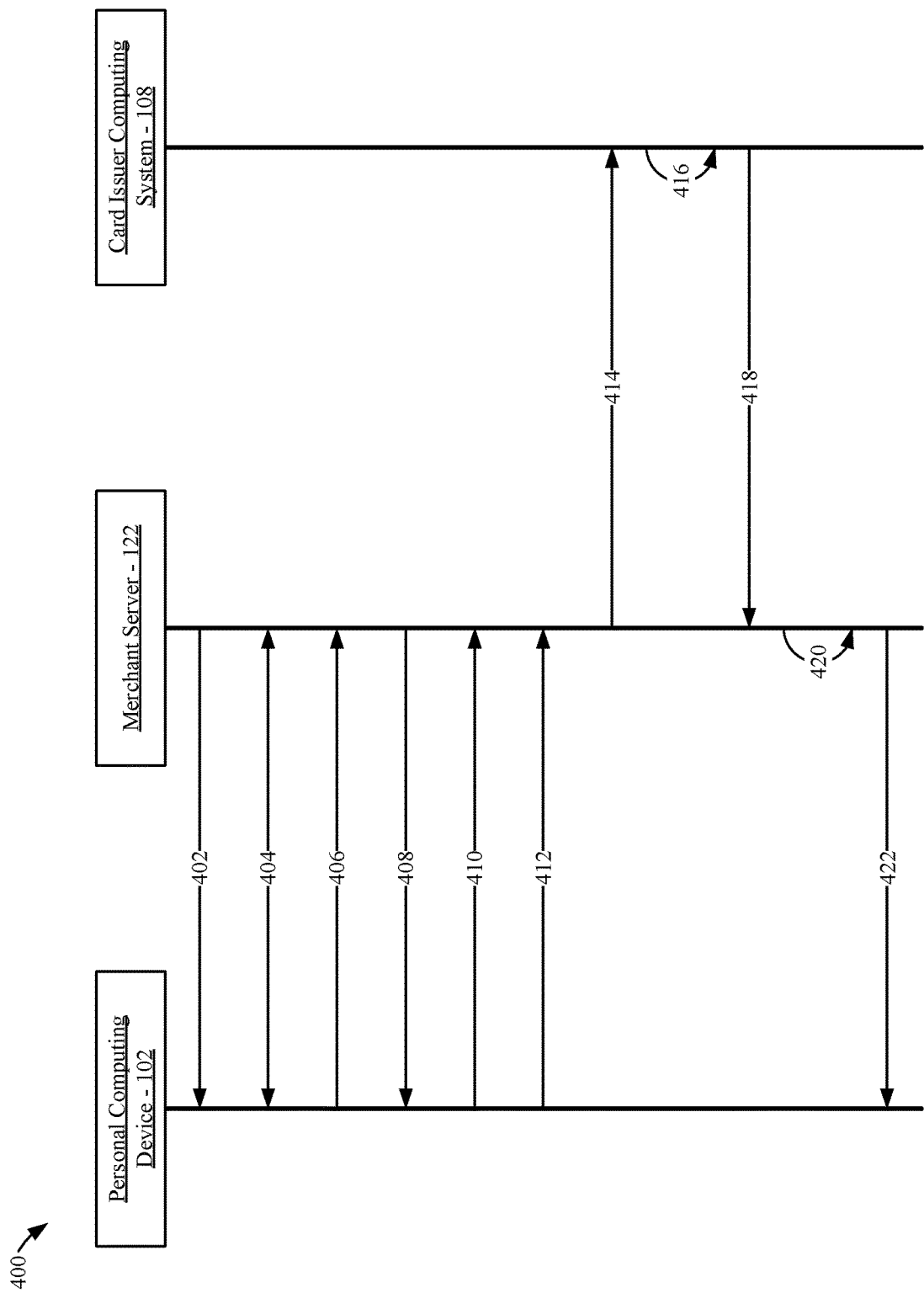
FIG. 4 is a flowchart of a method of performing an online transaction according to an example embodiment.

Referring to FIG. 4, a flowchart of a method 400 of performing an online transaction is shown according to an example embodiment. The method 400 is performed by the personal computing device 102, the merchant server 122, and the card issuer computing system 108. Generally, in the method 400, a user of the personal computing device 102 purchases goods or services from the merchant affiliated with the merchant server via an application running on the personal computing device 102 (e.g., via the local merchant circuit 110). The user provides payment information to the merchant server 122, which is then validated with the card issuer computing system 108.

The method 400 begins when the merchant server 122 transmits a shopping page to the personal computing device 102 at 402. In some arrangements, the shopping page is an internet shopping portal accessible via an internet browser running on the personal computing device 102. In other arrangements, the shopping page is facilitated on a merchant application forming the local merchant circuit 110, and the merchant server 122 provides content to the merchant application. The shopping page allows the user to browse goods and services offered by the merchant via a user interface presented on the personal computing device 102.

The user interacts with the shopping page at 404. The user interacts with the shopping page by providing input to the user interface of the shopping page. The input may relate to, for example, a product or service search query, browsing product or service information, reading product or service reviews, adding a product or service to a shopping cart, and the like. After the user has populated a shopping cart with selected goods or services, the customer sends a checkout request at 406. The customer sends the checkout request via the personal computing device 102. The checkout request is received by the merchant server 122. Upon receipt of the checkout request, the merchant server 122 transmits a checkout user interface to the shopping page at 408. The checkout user interface presents a summary of the goods or services in the user's shopping cart, including a total cost. The checkout user interface includes checkout fields for the user to populate with user information (e.g., user name, user address, user shipping address, user phone number, user e-mail address, etc.) and payment information (e.g., credit card account number, credit card expiration date, CCV number, etc.). The checkout user interface also includes an authentication code input field where the user can provide an authentication code generated by a payment card (e.g., the smart card 104) used to complete the purchase.

The user provides payment information to the merchant server 122 at 410. The user provides the payment information via the personal computing device 102, which transmits the payment information to the merchant server. The payment information includes at least a payment card account number (e.g., a credit card account number) and a payment card expiration. In some arrangements, the payment information may include any of a type of payment card (e.g., Visa®, MasterCard®, etc.), a billing address associated with the payment card, and a CCV number associated with the payment card.

At 412, the user provides an authentication code to the merchant server 122. The payment card is the smart card 104. Accordingly, the payment card includes a contactless chip 115 that is configured to generate and transmit an authentication code. The authentication code is used to verify that that payment card is present at the time of the purchase. During a transaction, the absence of receipt of an authentication code may indicate that the person attempting the transaction is a fraudster (e.g., a person that copied the account number and expiration date of the card, but does not have access to the card to generate an authentication code). To provide the authentication code to the merchant server 122, the user first provides the authentication code to the personal computing device 102. To do so, the user brings the contactless chip 115 of the smart card 104 into proximity with a wireless antenna of the personal computing device 102. When the contactless chip 115 of the smart card 104 is in sufficient proximity with the wireless antenna of the personal computing device 102, a wireless data connection is established between the contactless chip 115 and the personal computing device 102 such that the contactless chip 115 can generate and transmit the authentication code to the personal computing device 102. In some arrangements, the authentication code includes a cryptogram that can only be decoded by the card issuer associated with the payment card. The personal computing device 102 then transmits the authentication code to the merchant server 122.

In some arrangements, steps 410 and 412 are combined and the payment information and the authentication code are provided at the same time. In such arrangements, the payment information and the authentication code may be provided by the contactless chip 115 of the smart card 104.

The merchant server 122 transmits a payment approval request to the card issuer computing system 108 at 414. The payment approval request includes the payment information, the authentication code, and a payment amount associated with the transaction (i.e., the cost of the goods and/or services being purchase by the user and from the merchant). In some arrangements, the payment approval request also includes user information (e.g., the user's name, the user's address, etc.). The card issuer computing system 108 verifies the information in the payment approval request and that the account holder of the transaction has enough funds available (or available credit) to complete the transaction at 416. The card issuer computing system 108 compares the received user information with known user information associated with the account number of the payment card. For example, the card issue computing system 108 verifies the provided name and address of the user with the known name and address of the account holder associated with the payment card. Additionally, the card issuer computing system 108 decodes the authentication code to verify that the authentication code was generated by the payment card (i.e., that the authentication code was not fraudulently created). In some arrangements, the card issuer computing system 108 decodes a cryptogram included in the authentication code to verify that the cryptogram was generated by the contactless chip 115 of the smart card 104.

An approval decision is transmitted at 418. The approval decision is transmitted from the card issuer computing system 108 to the merchant server 122. If any of the information provided to the card issuer computing system 108 does not match known information or cannot be otherwise verified at 416 or if the user does not have enough funds (or credit) available to complete the transaction, the approval decision is a denial message. If all of the information provided matches known information and can be otherwise verified at 416 and if the user has enough funds (or credit) available to complete the transaction, the approval decision is an approval message. In some arrangements, the approval message includes a confirmation code generated by the card issuer computing system 108.

The merchant server 122 generates a response page at 420. The response page includes a user interface that will be displayed to the user via the personal computing device 102. In arrangements where the approval decision is a denial message, the response page is formatted to indicate to the user that the transaction failed. In arrangements where the approval decision is an approval message, the response page is formatted to indicate to the user that the transaction was approved and that the order is confirmed. In such arrangements, the response page may include a confirmation number or order number that is unique to the completed transaction between user and the merchant. The merchant server 122 transmits the response page to the personal computing device 102 at 422. The user can view the response page via the personal computing device 102.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method of authenticating online purchases by detecting a presence of an authorized smart card at a personal computing device of a customer, the method being performed at a card issuer computing system and comprising:

maintaining, at a customer database, personal information and financial information for a plurality of customers with issued smart cards;

receiving, by an authentication logic, an authentication request from a merchant server in response to the merchant server receiving an authentication code from a local merchant circuit of the personal computing device, the authentication request comprising the authentication code and payment information, the authentication code including a cryptogram provided to the local merchant circuit from a smart card via a short-range wireless communication between a contactless chip of the smart card and the personal computing device, wherein the payment information is separately provided to the local merchant circuit from a user input via the personal computing device;

authenticating, by the authentication logic, the smart card, the payment information, and the customer by:
  decoding the authentication code to reveal customer information and the cryptogram;
  validating the cryptogram to authenticate the smart card;
  verifying that the payment information at least partially matches information regarding the customer stored in the customer database to authenticate the payment information; and
  verifying that the revealed customer information at least partially matches the payment information to authenticate the customer; and transmitting, based on authenticating the smart card, the payment information, and the customer, an authentication approval to the merchant server for an online purchase corresponding to the authentication request, the online purchase between a merchant associated with the merchant server and the customer.

2. The method of claim 1, wherein the authentication request is received as a transaction authorization request entailing a charge of less than one dollar from a financial account associated with the customer, and wherein the authentication request is processed as a transaction authorization request.

3. The method of claim 2, wherein the authentication logic is structured to recognize transaction authorization requests entailing the charge of less than one dollar as authentication requests, and wherein the authentication logic is structured to apply a specific set of authentication rules for authentication requests.

4. The method of claim 1, wherein the short-range wireless communication is a near-field communication transmission.

5. The method of claim 1, wherein the customer information includes at least one of personal information and financial information relating to the customer, wherein the authentication logic is structured to compare the at least one of personal information and financial information with stored information in the customer database.

6. The method of claim 1, wherein the user input is provided via a GUI displayed on a display of the personal computing device.

7. A card issuer computing system for authenticating online purchases by detecting a presence of an authorized smart card at a personal computing device of a customer, the system comprising:

an issuer network logic structured to enable the card issuer computing system to exchange data over a network;

a customer database maintaining personal information and financial information for a plurality of customers with issued smart cards; and an authentication logic structured to:
- receive an authentication request from a merchant server in response to the merchant server receiving an authentication code from a local merchant circuit of the personal computing device, the authentication request comprising the authentication code and payment information, the authentication code including a cryptogram provided to the local merchant circuit from a smart card via a short-range wireless communication between a contactless chip of the smart card and the personal computing device, wherein the payment information is separately provided to the local merchant circuit from a user input via the personal computing device;
- authenticate the smart card, the payment information, and the customer by:
  - decoding the authentication code to reveal customer information and the cryptogram;
  - validating the cryptogram to authenticate the smart card;
  - verifying that the payment information at least partially matches information regarding the customer stored in the customer database to authenticate the payment information; and
  - verifying that the revealed customer information at least partially matches the payment information to authenticate the customer; and
- transmit, based on authenticating the smart card, the payment information, and the customer, an authentication approval to the merchant server for an online purchase corresponding to the authentication request, the online purchase between a merchant associated with the merchant server and the customer via the personal computing device.

8. The system of claim 7, wherein the authentication request is received as a transaction authorization request entailing a charge of less than one dollar from a financial account associated with the customer, and wherein the authentication request is processed as a transaction authorization request.

9. The system of claim 8, wherein the authentication logic is structured to recognize transaction authorization requests entailing the charge of less than one dollar as authentication requests, and wherein the authentication logic is structured to apply a specific set of authentication rules for authentication requests.

10. The system of claim 7, wherein the short-range wireless communication is a near-field communication transmission.

11. The system of claim 7, wherein the customer information includes at least one of personal information and financial information relating to the customer, wherein the authentication logic is structured to compare the at least one of personal information and financial information with stored information in the customer database.

12. The system of claim 7, wherein the user input is provided via a GUI displayed on a display of the personal computing device.

13. A non-transitory computer readable media having computer-executable instructions embodied therein that, when executed by a transaction circuit of a card issuer computing system, causes the card issuer computing system to perform operations to authenticate online purchases by detecting a presence of an authorized smart card at a personal computing device of a customer, the operations comprising:
- maintain, at a customer database, personal information and financial information for a plurality of customers with issued smart cards;
- receive, by an authentication logic, an authentication request sent from a merchant server in response to the merchant server receiving an authentication code from a local merchant circuit of the personal computing device, the authentication request comprising the authentication code and payment information, the authentication code including a cryptogram provided to the local merchant circuit from a smart card via a short-range wireless communication between a contactless chip of the smart card and the personal computing device, wherein the payment information is separately provided to the local merchant circuit from a user input via the personal computing device;
- authenticate, by the authentication logic, the smart card, the payment information, and the customer by:
  - decoding the authentication code to reveal customer information and the cryptogram;
  - validating the cryptogram to authenticate the smart card;
  - verifying that the payment information at least partially matches information regarding the customer stored in the customer database to authenticate the payment information; and
  - verifying that the revealed customer information at least partially matches the payment information to authenticate the customer; and
- transmit, based on authenticating the smart card, the payment information, and the customer, an authentication approval to the merchant server for an online purchase corresponding to the authentication request, the online purchase between a merchant associated with the merchant server and the customer.

14. The media of claim 13, wherein the authentication request is received as a transaction authorization request entailing a charge of less than one dollar from a financial account associated with the customer, and wherein the authentication request is processed as a transaction authorization request.

15. The media of claim 14, wherein the authentication logic is structured to recognize transaction authorization requests entailing the charge of less than one dollar as authentication requests, and wherein the authentication logic is structured to apply a specific set of authentication rules for authentication requests.

16. The media of claim 13, wherein the short-range wireless communication is a near-field communication transmission.

17. The media of claim 13, wherein the authentication code includes at least one of personal information and financial information relating to the customer, wherein the authentication logic is structured to compare the at least one of personal information and financial information with stored information in the customer database.

18. The media of claim 13, wherein the user input is provided via a GUI displayed on a display of the personal computing device.

* * * * *